US007138903B2

(12) United States Patent
Doong et al.

(10) Patent No.: US 7,138,903 B2

(45) Date of Patent: Nov. 21, 2006

(54) LOCK MODULE USING COLORED LIGHT RAYS TO IDENTIFY THE APPLICATION OF AN ACCURATE KEY

(76) Inventors: Jian-Choung Doong, 10F, No. 6, Sec. 3, Hsingsheng S. Rd., Taipei (TW); Jin-In Chen, 10F, No. 6, Sec. 3, Hsingsheng S. Rd., Taipei (TW)

( * ) Notice: Subject to any disclaimer, the term of this patent is extended or adjusted under 35 U.S.C. 154(b) by 358 days.

(21) Appl. No.: 10/858,583

(22) Filed: Jun. 2, 2004

(65) Prior Publication Data

US 2005/0270767 A1 Dec. 8, 2005

(51) Int. Cl.
*G06K 19/00* (2006.01)
*G06K 7/10* (2006.01)
*G01J 1/42* (2006.01)

(52) U.S. Cl. ..................... 340/5.6; 250/208.4; 250/271

(58) Field of Classification Search ................. 340/5.6, 340/5.67; 70/DIG. 51

See application file for complete search history.

(56) References Cited

U.S. PATENT DOCUMENTS 3,671,752 A * 6/1972 Bostrom .................. 250/208.4
3,902,342 A * 9/1975 Zucker et al. ................ 70/402
4,625,100 A * 11/1986 Smith ........................ 340/5.67
4,871,909 A * 10/1989 Kokubu ...................... 250/229
5,838,232 A * 11/1998 Kim et al. .................... 70/277
6,879,242 B1 * 4/2005 Alon .......................... 340/5.6

* cited by examiner

*Primary Examiner*—Brian Zimmerman
*Assistant Examiner*—Clara Yang
(74) *Attorney, Agent, or Firm*—Jackson Walker, LLP

(57) ABSTRACT

A lock module includes a transmitting module to continuously transmit multiple colored light rays, a key adapted to be inserted into the keyhole of the lock and having multiple colored optical lenses each permitting a specific colored light ray to pass therethrough and a receiving module to receive, store and compare the colored light rays from the multiple colored optical lenses to identify whether the key inserted into the keyhole is accurate. After an initial process of storing the sequence of the colored light rays by the receiving module, the receiving module is able to use stored information to compare the colored light rays subsequently passing through the colored optical lenses of another key to check whether the subsequent key is the accurate key.

17 Claims, 6 Drawing Sheets

LOCK MODULE USING COLORED LIGHT RAYS TO IDENTIFY THE APPLICATION OF AN ACCURATE KEY

BACKGROUND OF THE INVENTION

1. Field of the Invention

The present invention relates to a lock module, and more particularly to a lock module having a transmitting module to emit multiple colored light rays and a receiving module to receive filtered light rays and identify the time sequence of the filtered light emitted by the transmitted module. With various and changeable sequences of colored lenses on the key, the user's safety is secured.

2. Description of Related Art

A conventional lock generally has a plurality of pins movably mounted in a lock core with various arrangements and is unlocked by a key with a plurality of teeth corresponding to the pins. However, the conventional lock has not enough security to prevent a thief from unlocking the lock by using a simple tool instead of a correct key.

For promoting security, another lock using identification of light rays is invented. The lock has an emitting member to give off light rays and a receiving member to receive the light rays respectively installed at two sides of a keyhole of a lock core. A correct key for the lock has a plurality of openings corresponding to positions of the light ray emitting member. When the correct key is inserted in the keyhole, the light rays from the emitting member pass through the openings and are received by the receiving member, so the lock can be unlocked.

However, this lock also has a low security and is easy to be cracked down by an unauthorized manner.

Therefore, the invention provides a lock module using colored light rays to identify the application of the accurate key to obviate the aforementioned problems.

SUMMARY OF THE INVENTION

The main objective of the present invention is to provide a lock module having a transmitting module for transmitting multiple colored light rays and a receiving module for receiving signals passing through the key sandwiched between the transmitting module and the receiving module. Therefore, after the time sequences of the light rays are confirmed by the receiving module, the application of the key is confirmed.

Another objective of the present invention is that multiple colored lenses are mounted on the key to filter out different colored light rays to the color of the colored lenses to ensure that only the correct colored light ray is received by the receiving module.

Still another objective of the present invention is that optical fiber is used to transmit the colored light rays to ensure the light brightness so as to obviate the possibility that the light brightness influences the identification result.

Yet another objective of the present invention is that the optical fiber is used to transmit the colored light rays such that the unit number in the transmitting module is able to be decreased.

Yet another objective of the present invention is that the optical fiber is used to receive filtered light rays from the transmitting module such that the number of receiving units in the receiving module is able to be decreased.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
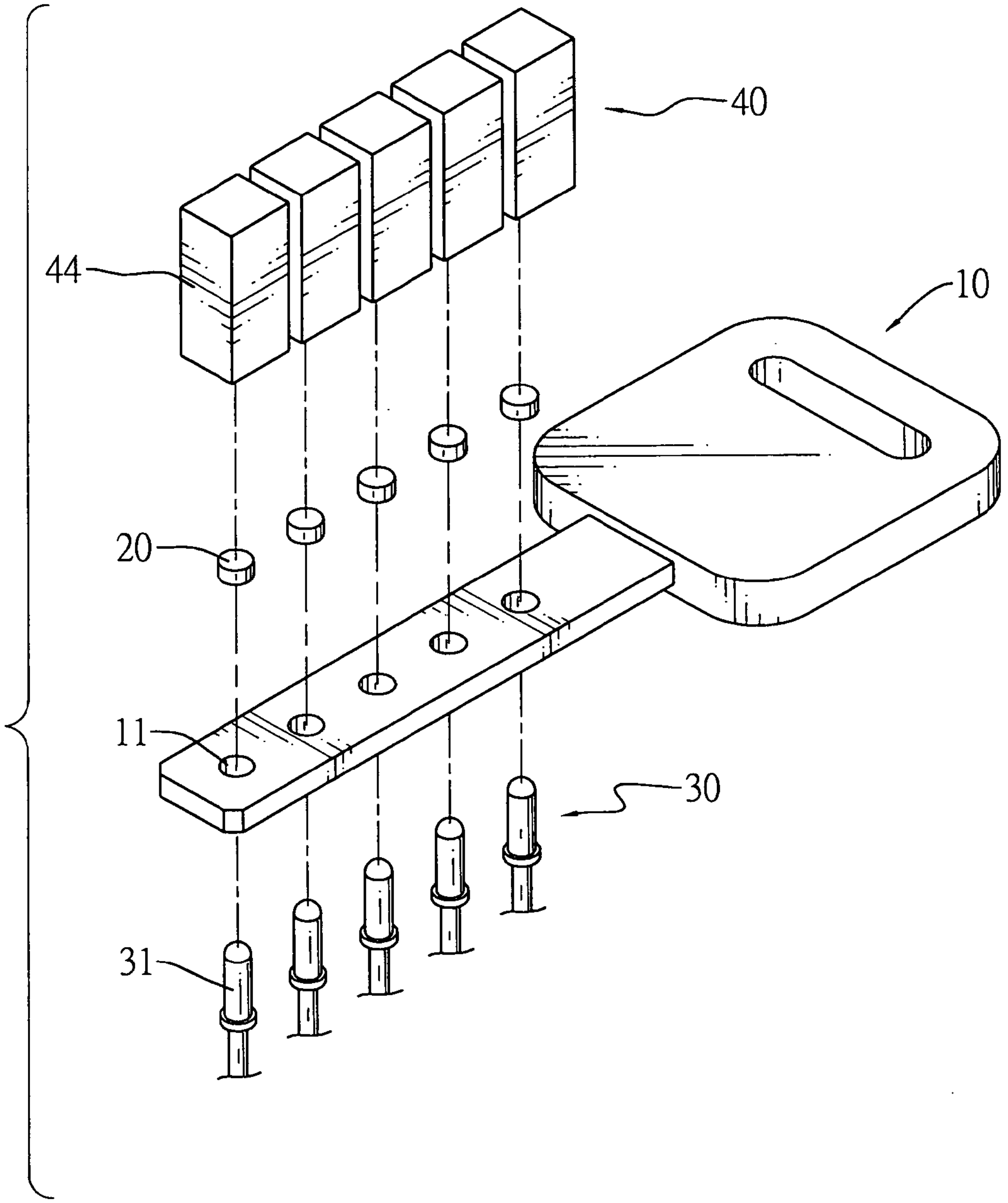
FIG. 1 is an exploded perspective view of the lock module of the present invention.
Figure 2:
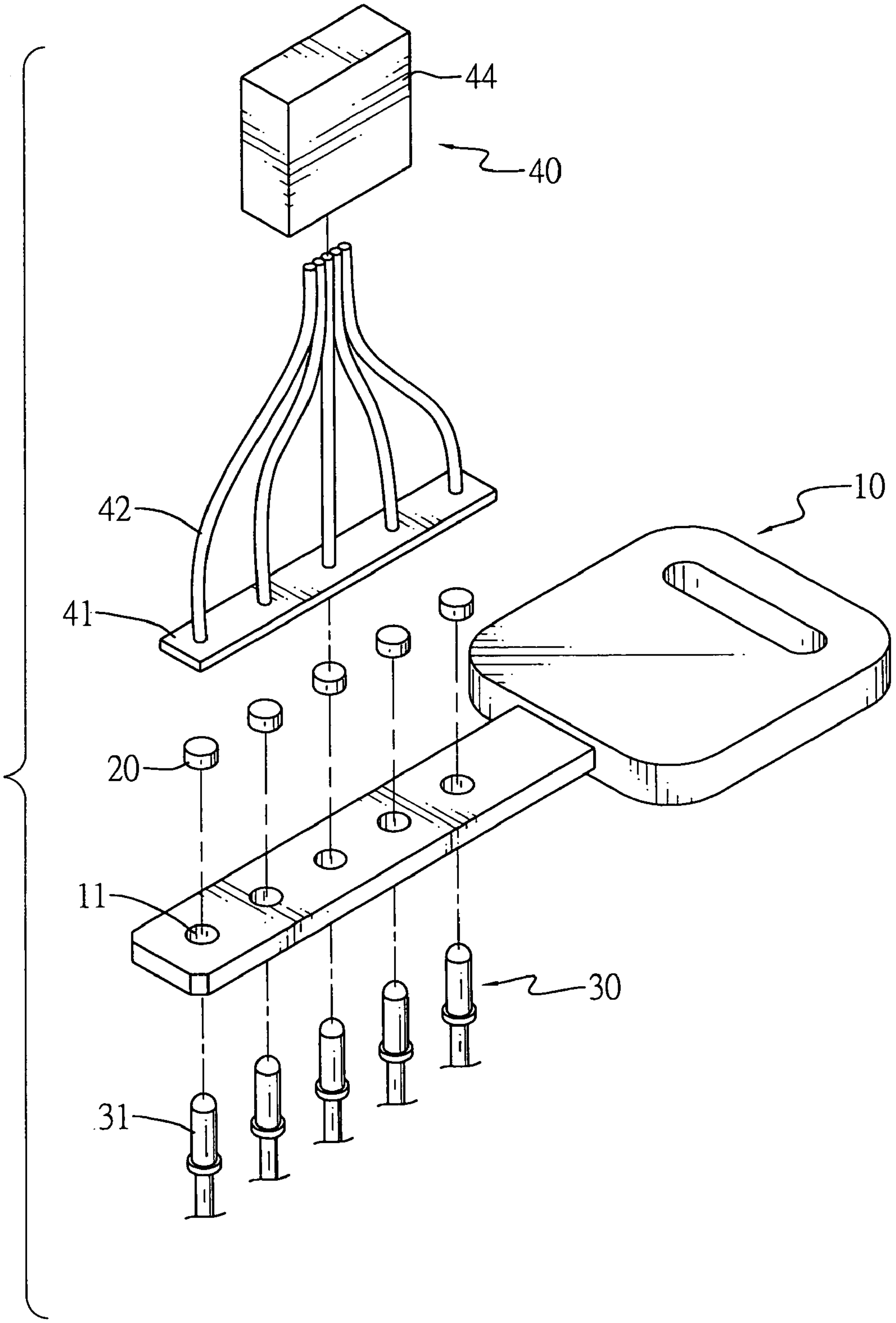
FIG. 2 is a schematic cross sectional view showing the application of the lock module in FIG. 1.

With reference to FIGS. 1 and 2, the lock module in accordance with the present invention is applied to opposite sides of a keyhole of a door and thus has a key (10), a transmitting module (30) and a receiving module (40). The transmitting module (30) and the receiving module (40) are opposite to each other to verify whether the key (10) inserted into the keyhole is accurate.

The key (10) has multiple positioning holes (11) and multiple optical lenses (20) each securely received in a corresponding one of the positioning holes (1). The optical lenses (20) are colored lenses. That is, each optical lens (20) allows a specific colored light ray to pass therethrough. Therefore, when the user has a large amount of colored optical lenses (20) available, the user is able to select whatever colored optical lenses to be placed in the positioning holes (11). As a result of the selection based on an individual's preference and the vast range of permutations possible, each key (10) is unique.

The transmitting module (30) is a light source to repeatedly emit multiple colored light rays. Preferably, the transmitting module (30) is composed of light emitting diodes (31) (LED) which are fixed on a first board (not shown) attached to a side wall of the keyhole. As well known in the art, the number of colors that can be emitted by one LED (31) at one time may be a series of up to 250 different kinds. Therefore, when the transmitting module (30) is activated, each of the LEDs (31) repeatedly and continuously emits 250 different colored light rays. The receiving module (40) is composed of multiple receiving units (44) each corresponding to one of the colored optical lenses (20) and one of the light emitting diodes (31). Therefore, the light rays from each of the LEDs (31) pass through the colored optical lenses (20) and are received and store by the receiving units (44). After the receiving module (40) stores the time sequence of the colored light rays from the transmitting module (30), the receiving module (40) will compare with subsequent light transmission from the transmitting module (30) to see if the time sequence of the colored light rays corresponds to the time sequence of the stored colored light rays. As a result of the comparison, if the time sequences of two transmissions are correct, the key (10) is then able to activate the door. However, if the time sequence of the colored light rays from the subsequent transmission is not identical to what is stored in the receiving module (40), the key (10) is useless.

With reference to FIG. 2, it is noted that the receiving module (40) has multiple optical fibers (42) securely mounted on a first board (41) attached to a side wall of the keyhole and opposite relative to the transmitting module (30). Each of the optical fibers (42) corresponds to one of the optical lenses (20) and one of the LEDs (31). An identifier (44) having the function to receive signals transmitted by the optical fibers (42) and identify the time sequence of the received signal is connected to free ends of the optical fibers (42).

The colored light rays given off from the LEDs (31) are received by the corresponding optical fibers (42) and transferred into the identifier (44) for identification of time sequence of color.

Therefore, a lock unlocking process according to the present invention has the following steps of:

1. Initially, an original key is inserted in the keyhole of the lock;

2. Colored light rays are given off from the transmitting module and then pass through the colored optical lenses;

3. The colored light rays passing through the colored optical lenses are received by optical fibers and transferred into the identifier, and the color arrangement of the light rays is set and stored;

4. A key is inserted in the keyhole for unlocking, and colored light rays are given off from the transmitting module and then pass through the colored optical lenses;

5. The colored light rays are received by the optical fibers and transferred into the identifier;

6. The color arrangement of the key is compared with the stored arrangement to identify the key.

Figure 3:
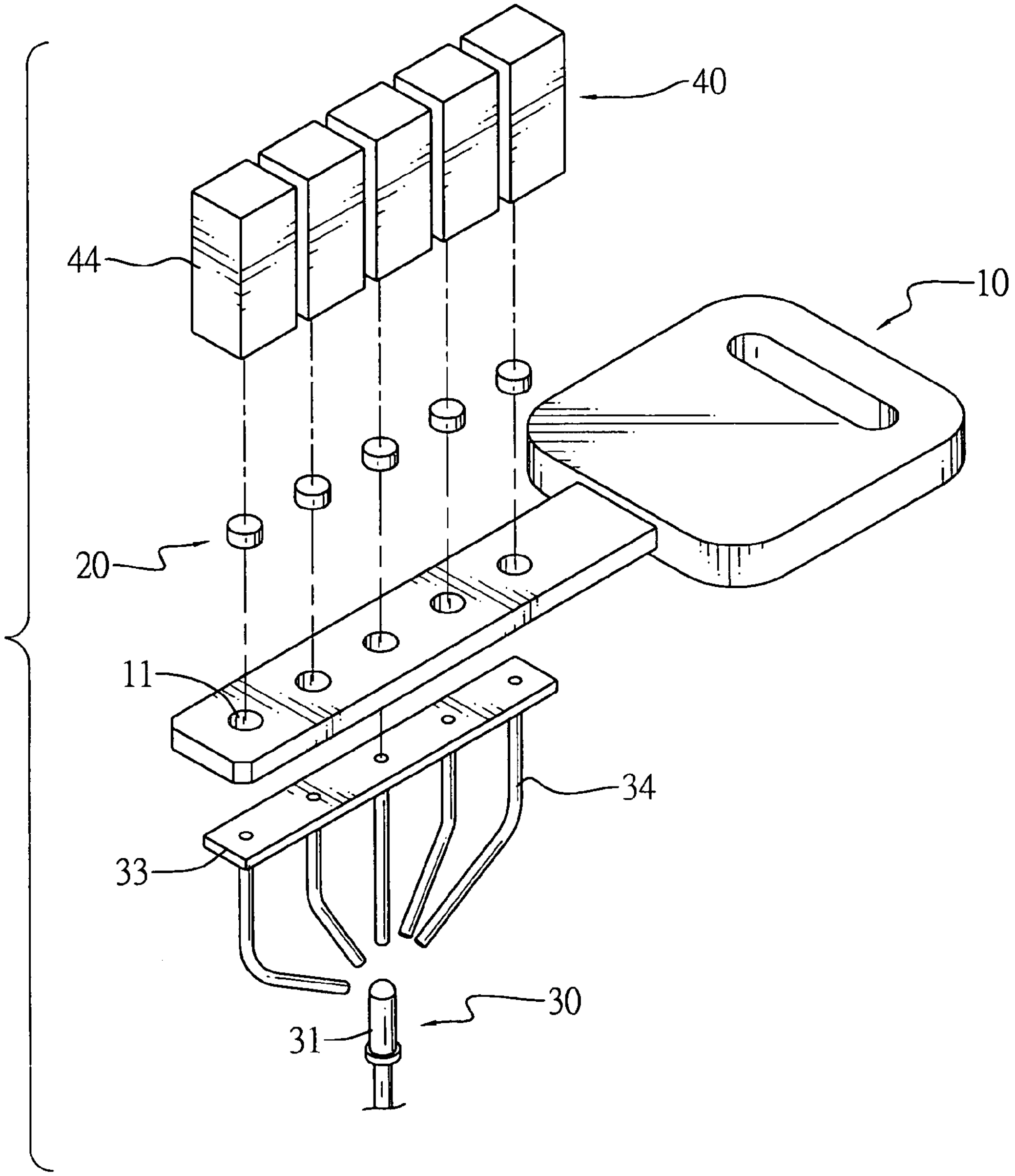
FIG. 3 is an exploded perspective view showing an embodiment of the lock module of the present invention.

With reference to FIG. 3, it is noted that there is only one LED (31) provided in this embodiment. In order to accomplish the same result of transmitting different and multiple colored light rays to the receiving module (40), multiple optical fibers (34) are provided and secured on a second board (33) which is mounted on a side wall of the keyhole. The receiving module (40) thus has multiple identifiers (44) each corresponding to one of the colored optical lenses (20) and one of the optical fibers (34).

Figure 4:
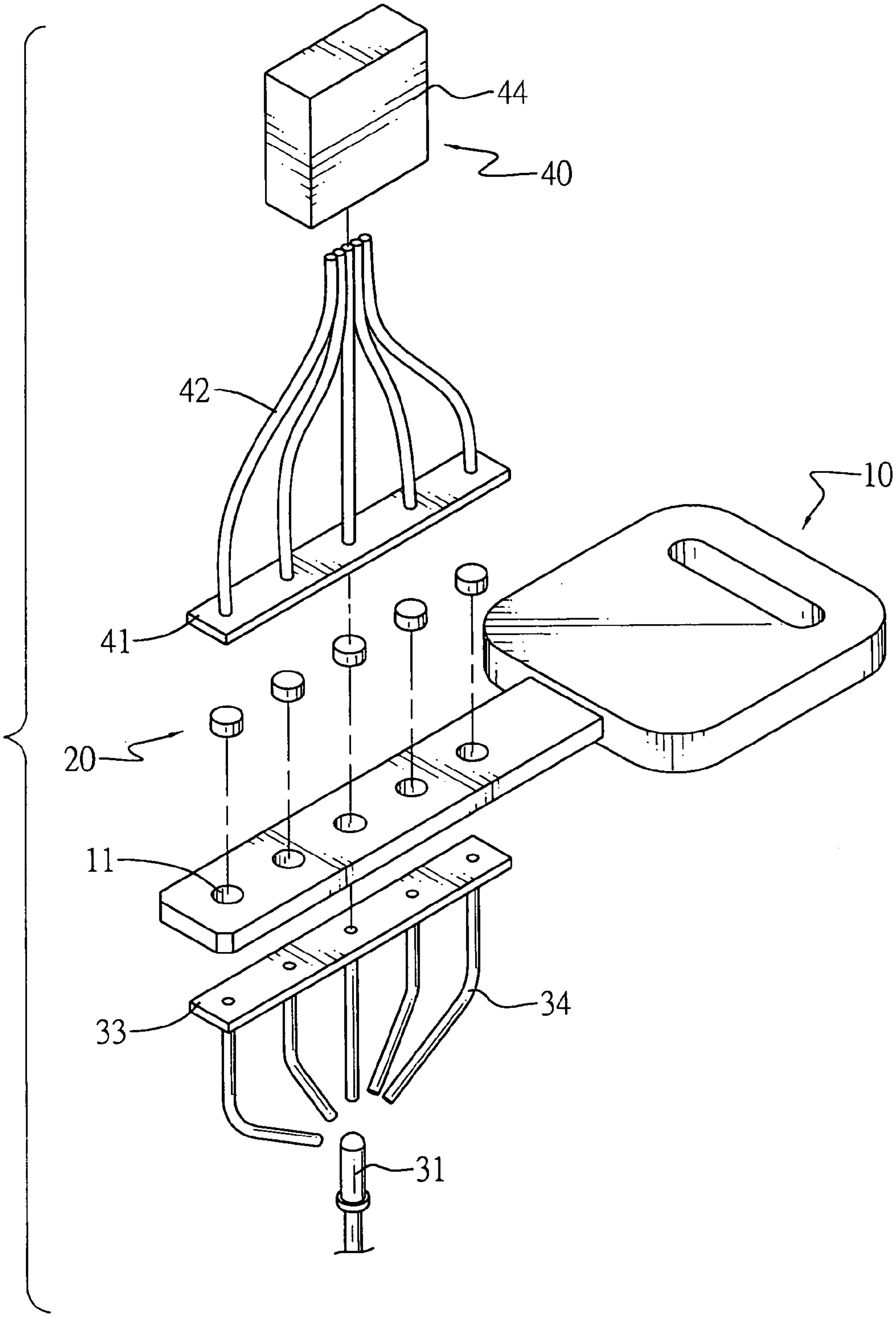
FIG. 4 is an exploded perspective view showing an embodiment of the lock module of the present invention.

A different embodiment is shown in FIG. 4 and has substantially the same structure as that disclosed in the embodiment in FIG. 1. The only difference is that the transmitting module (30) has only one light source, one LED (31) and that multiple optical fibers (34) mounted on the second board (33) are provided to transmit the colored light rays continuously transmitted by the LED (31). The receiving module (40) has only one identifier (44) and multiple optical fibers (42) securely attached to the first board (41) to respectively correspond to one of the colored optical lenses (20) in the key (10).

Figure 5A:
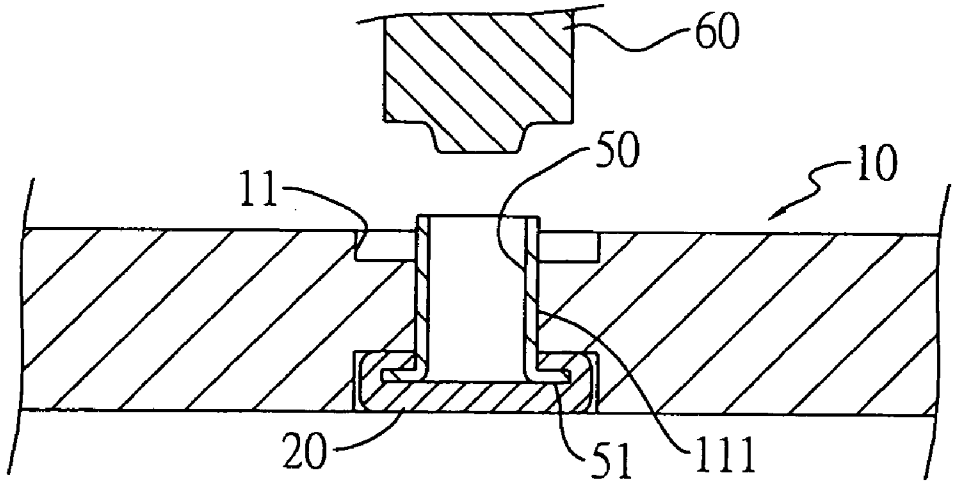
FIGS. 5A and 5B are schematic cross sectional views showing the mounting of the lenses on the key applied in the module of the present invention.
Figure 5B:
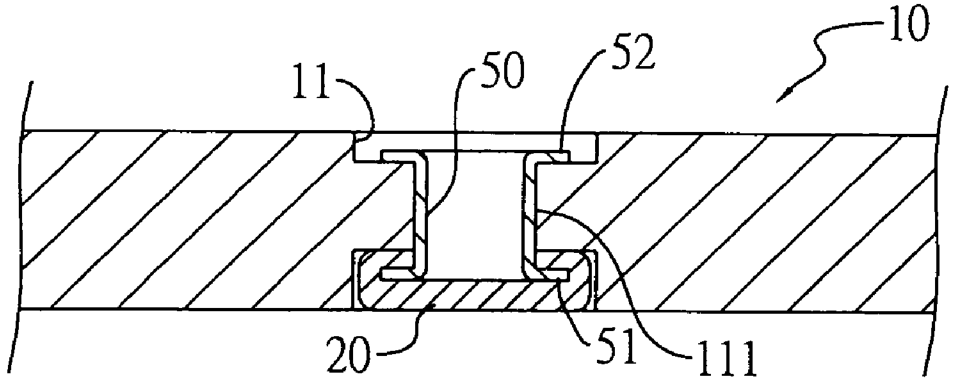

With reference to FIGS. 5A and 5B, it is noted that the positioning hole (11) has a neck (111) formed in a mediate portion of the positioning hole (11). A hollow cylinder (50) has a diameter slightly smaller than a diameter of the neck (111) and is received in the positioning hole (11). One end of the hollow cylinder (50) is provided with the colored optical fiber (20) and the other end of the hollow cylinder (50) extends out of the positioning hole (11). A tool (60) is employed to deform the extending out end of the hollow cylinder (50) to allow the hollow cylinder (50) to have a bend (52) which is securely engaged with a side face defining the positioning hole (11). Thus, the hollow cylinder (50) with the colored optical lens (20) is securely mounted in the positioning hole (11) in the key (10).

Figure 6:
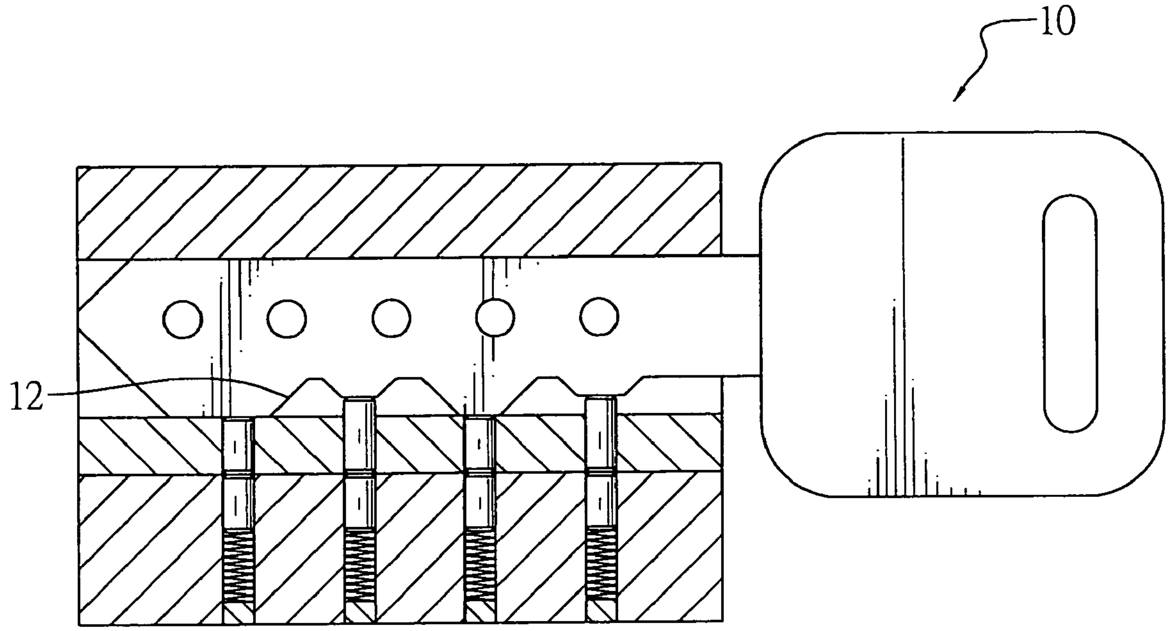
FIG. 6 is a schematic view showing a different embodiment of the key applied to the lock module of the present invention.

Furthermore, to increase the application of the key (10) of the present invention, the key (10) has teeth (12), as shown in FIG. 6, formed on a side of the key (10) so that the key (10) may be employed to a mechanical lock.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A lock module adapted for a keyhole of a lock, the lock module comprising:

a transmitting module to continuously transmit multiple colored light rays;

a key adapted to be inserted into the keyhole of the lock and having multiple colored optical lenses each permitting a specific colored light ray to pass therethrough; and a receiving module to receive, store and compare the colored light rays from the multiple colored optical lenses to identify whether the key inserted into the keyhole is accurate, wherein after an initial process of storing sequence of the colored light rays by the receiving module, the receiving module is able to use stored information to compare with the colored light rays subsequently passing through the colored optical lenses of another key to check whether the subsequent key is accurate.

2. The lock module as claimed in claim 1, wherein the transmitting module is composed of multiple light emitting diodes.

3. The lock module as claimed in claim 2, wherein the receiving module has an identifier to receive and store signals from the transmitting module.

4. The lock module as claimed in claim 3, wherein the multiple light emitting diodes are mounted on a first board which is adapted to be mounted on a side wall defining the keyhole.

5. The lock module as claimed in claim 4, wherein multiple optical fibers mounted on a second board which is adapted to be mounted on a side wall defining the keyhole and opposite to the first board are provided to correspond to the multiple optical lenses and the light emitting diodes.

6. The lock module as claimed in claim 2, wherein the multiple light emitting diodes are mounted on a first board which is adapted to be mounted on a side wall defining the keyhole.

7. The lock module as claimed in claim 6, wherein multiple optical fibers mounted on a second board which is adapted to be mounted on a side wall defining the keyhole and opposite to the first board are provided to correspond to the multiple optical lenses and the light emitting diodes.

8. The lock module as claimed in claim 1, wherein the receiving module has an identifier to receive and store signals from the transmitting module.

9. The lock module as claimed in claim 8, wherein the transmitting module has one light emitting diode securely mounted on a first board which is mounted on a side wall defining the keyhole to continuously transmit multiple colored light rays and multiple first optical fibers which are mounted on a second board which is adapted to be mounted on a side wall defining the keyhole, wherein the multiple first optical fibers are provided to correspond to the multiple optical lenses and the light emitting diode.

10. The lock module as claimed in claim 9, wherein multiple second optical fibers mounted on a third board which is securely mounted on a side wall to be opposite to the second board are provided to correspond to the multiple colored optical lenses and the multiple first optical lenses.

11. The lock module as claimed in claim 10, wherein the key has teeth formed on a side face of the key.

12. The lock module as claimed in claim 9, wherein the receiving module has multiple identifiers each corresponding to one of the colored optical lenses and the first optical fibers.

13. The lock module as claimed in claim 12, wherein the key has teeth formed on a side face of the key.

14. The lock module as claimed in claim 9, wherein the key has teeth formed on a side face of the key.

15. The lock module as claimed in claim 1, wherein the transmitting module has one light emitting diode securely mounted on a first board which is mounted on a side wall defining the keyhole to continuously transmit multiple colored light rays and multiple first optical fibers which are mounted on a second board which is adapted to be mounted on a side wall defining the keyhole, wherein the multiple first optical fibers are provided to correspond to the multiple optical lenses and the light emitting diode.

16. The lock module as claimed in claim 15, wherein the receiving module has multiple identifiers each corresponding to one of the colored optical lenses and the first optical fibers.

17. The lock module as claimed in claim 16, wherein the key has teeth formed on a side face of the key.

* * * * *